UNITED STATES PATENT OFFICE.

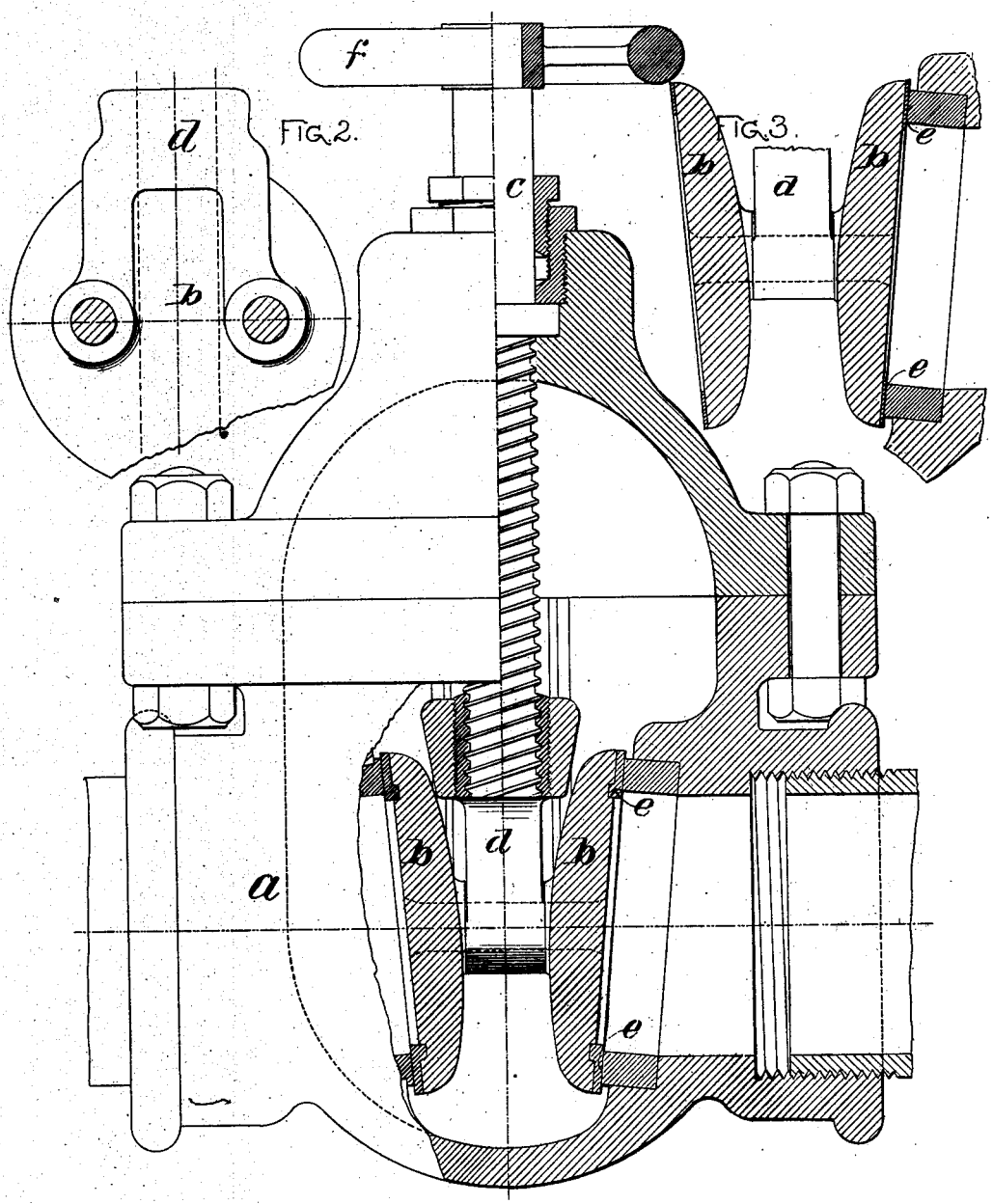

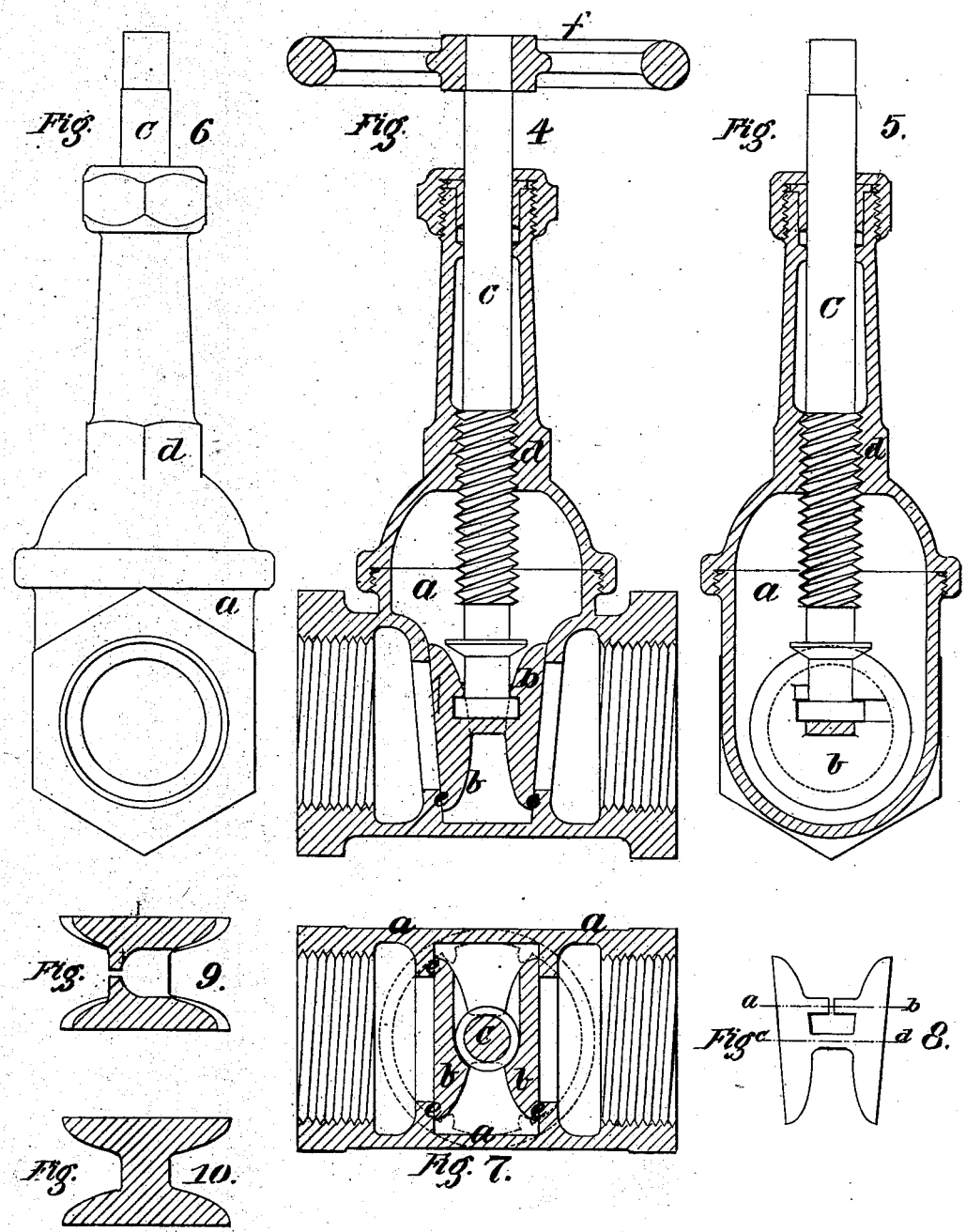

ZEBULON E. COFFIN, OF NEWTON, MASSACHUSETTS, ASSIGNOR TO HIMSELF AND E. E. COFFIN, OF SAME PLACE.

STOP-VALVE.

SPECIFICATION forming part of Letters Patent No. 236,780, dated January 18, 1881.

Application filed January 30, 1880.

*To all whom it may concern:*

Be it known that I, Z. ERASTUS COFFIN, of the city of Newton, in the county of Middlesex and State of Massachusetts, have invented certain new and useful Improvements in Stop-Valves (sometimes called "stop-cocks" and "stop-gates") for Water and other Pipes and Conduits, of which the following is a full and exact description, reference being had to the accompanying drawings, and to the letters of reference marked thereon.

Like letters refer to the same or corresponding parts in all the figures.

Referring to the drawings, Figure 1 is a sectional elevation of a stop-valve complete, the sectional plane coinciding with the axes of the water-way and the valve-stem. Fig. 2 is a view of one of the disks or lobes of the "double-disk valve," so called, taken from between the two looking in the line of the water-way. Fig. 3 is a sectional view of the valve and one seat corresponding to Fig. 1. Fig. 4 is a sectional view or elevation of a stop-valve complete, showing another mode of attaching or rather of connecting the valve-stem to the valve. Various modes of connecting can be used. The two shown are sufficient for illustration. Fig. 5 is a sectional elevation, the plane of section being taken at right angles with that of Fig. 4, and coinciding with the axial line of the valve-stem. Fig. 6 is a corresponding elevation of same. Fig. 7 is a sectional view, the plane being taken coincident with the axis of water-way and at right angles with that of Fig. 4, and also that of Fig. 5. Fig. 8 is an elevation of the valve. Fig. 9 is a section of same on line *a b*. Fig. 10 is a section on line *c d*.

My invention relates, first, to the construction of the "double-disk valve," so called, whereby the two lobes or disks are firmly and positively attached to each other by means of a comparatively small neck or union-base, so as to allow the two disks or faces to readily adjust themselves to the seats by means of the elasticity or yielding action resulting from the comparatively small size or area of the parts of the positive connection and without the application of any injurious amount of force through the valve-stem in pressing the valve to its seat. This positive union is formed at or near the middle or center of the valve, and obviates the need of the heretofore-used loose joint or leaving separate the two lobes or disks of the valve.

With reference to the drawings, *a* is the case or shell. *b* is the valve. *c* is the valve-stem. *d* is the nut in which the screw valve-stem works. *e* is the valve-seat. *f* is a hand-wheel for operating the valve-stem, for which a wrench or any other means may be substituted.

Although these stop-valves are for use in all liquids and fluids, I use the term "water" in the description for brevity and convenience.

When the screw valve-stem is local—*i. e.*, not to move out and in with the valve—I use the nut for the connection or union-base between the two disks or lobes of the valve. If otherwise, the connection may be made, as see Figs. 4, 5, 7. In either case it is essential that the connection between the two disks be so reduced in area or size as to allow all needful flexibility or yielding in the connection or adjacent parts of the disks to permit the valves to properly adjust and seat themselves, so overcoming any slight variation in the angles of valve and seat. The union between the two disks may be made by riveting, as see Figs. 1, 2, 3, by casting in one, as see Figs. 4, 5, 6, 7, 8, 9, 10, or other like positive and flexible attachment. When it is required to pass the valve-stem down centrally between the two disks the union may be extended laterally and pierced, so it may pass through it, as see Figs. 1, 2, 3. In this case those points in the faces of the valve in a line with the lateral extremes, being comparatively inflexible, will sufficiently adjust by the usual looseness of the stem in the nut, while all other points will adjust by the flexibility, as described. In most cases it is not necessary to have the widened base or union. In the case shown it is used to allow the screw to pass down in the middle.

I will here explain that the valve and seats are supposed to be made true and of corresponding angular relation, and that the self-adjusting quality to be secured by the described positive and yielding connection of the two disks is for the purpose of meeting all mechanical or accidental imperfection in the relative angles and adjustment of the valve-faces to the faces of the valve-seats.

The described connection between the two lobes or disks forming the valve is not an expansible nor a yielding one in any other sense than that which relates to the relative angular adjustment of the two faces. It cannot be expanded or compressed, as is the case with some other valves having other kinds of connections.

I claim—

1. In combination with the disks or lobes *b b*, the non-expansible unjointed union or neck constructed at or near the center of the disks or lobes, and uniting them so as to permit their relative angular adjustment, substantially as shown and described.

2. In combination with the non-expansible unjointed adjusting disk-connection, the attached nut and screw *c*, substantially as shown and described.

3. In combination with the two disks or lobes of the valve *b b*, the two non-expansible hubs or connections, united by the nut *d* and positively secured to the disks or lobes *b b*, substantially as shown and described.

4. In a stop-valve, the combination of the two disks, their non-expansible unjointed adjusting connection, the relatively-angular seats and faces at *e*, the body or case *a*, and screw *c*, substantially as described.

ZEBULON ERASTUS COFFIN.

Witnesses:
D. N. B. COFFIN,
EDWARD H. MASON.